(12) United States Patent
Nagahara et al.

(10) Patent No.: US 10,821,566 B2
(45) Date of Patent: Nov. 3, 2020

(54) MACHINE TOOL BED

(71) Applicant: DMG MORI CO., LTD., Nara (JP)

(72) Inventors: Hiroki Nagahara, Nara (JP); Isao Hikita, Nara (JP); Yusuke Maegawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 16/318,577

(22) PCT Filed: Jul. 26, 2017

(86) PCT No.: PCT/JP2017/026972
§ 371 (c)(1),
(2) Date: Jan. 17, 2019

(87) PCT Pub. No.: WO2018/025711
PCT Pub. Date: Feb. 8, 2018

(65) Prior Publication Data
US 2019/0283194 A1    Sep. 19, 2019

(30) Foreign Application Priority Data

Aug. 3, 2016   (JP) .................................. 2016-152638

(51) Int. Cl.
*B23Q 1/01* (2006.01)
*F16J 15/14* (2006.01)

(52) U.S. Cl.
CPC ............... *B23Q 1/015* (2013.01); *B23Q 1/01* (2013.01); *F16J 15/14* (2013.01)

(58) Field of Classification Search
CPC ......... B23Q 1/0063; B23Q 1/015; B23Q 1/01
See application file for complete search history.

(56) References Cited

U.S. PATENT DOCUMENTS

2007/0234541 A1\* 10/2007 Feinauer ................ B23Q 1/015
29/27 C

FOREIGN PATENT DOCUMENTS

| CN | 104889749 A | 9/2015 |
|---|---|---|
| JP | S60114431 A | 6/1985 |
| JP | 2000135639 A | 5/2000 |
| JP | 2005101456 A | 4/2005 |
| JP | 2006316919 A | 11/2006 |
| JP | 2009233805 A | 10/2009 |
| JP | 2010031903 A | 2/2010 |
| WO | 2010110030 A1 | 9/2010 |

\* cited by examiner

*Primary Examiner* — Alan Snyder
(74) *Attorney, Agent, or Firm* — Miller, Matthias & Hull LLP

(57) ABSTRACT

A machine tool bed (1) is configured by integrally connecting element beds (2, 3) in a horizontal direction, the element beds (2, 3) to be connected each have a joint surface arranged to intersect with a horizontal plane, at least one element bed of the element beds (2, 3) to be connected to each other has a seal groove in the joint surface thereof, and the seal groove is filled with a sealant in a state where the element beds (2, 3) to be connected to each other are connected to each other.

6 Claims, 3 Drawing Sheets

MACHINE TOOL BED

TECHNICAL FIELD

The present invention relates to a seal structure of a machine tool bed which is constituted by connecting at least two element beds.

BACKGROUND ART

A known example of a machine tool is an NC lathe, for example, as disclosed in Patent Literature 1.

The lathe disclosed in Patent Literature 1 is a multiple lathe which is able to machine one workpiece with several lathes in succession. More specifically, two lathes are aligned in one direction and beds of the lathes are connected to each other by a connecting mechanism. Thus, a multiple lathe has a configuration in which several beds are connected.

By the way, when a lathe is increased in size, the bed thereof is also increased in size accordingly. In this case, in terms of workability of the bed, several bed-constituting elements (hereinafter, such an element is sometimes referred to as "element bed") are manufactured and then the element beds are connected to produce a large-sized bed. Also in such a case, several element beds are connected by a connecting mechanism.

When element beds are connected to each other, as shown in FIG. 2 of Patent Literature 1, a packing is interposed between a connecting-side end surface of one element bed and a connecting-side end surface of the other element bed. This configuration allegedly improves adhesion between the one element bed and the other element bed, which prevents scatter of chips and leakage of cutting fluid.

CITATION LIST

Patent Literature

[Patent Literature 1] Japanese Unexamined Patent Application Publication No. 2000-135639

SUMMARY OF INVENTION

Technical Problem

However, in the above-described configuration of Patent Literature 1, since a packing is interposed between a connecting-side end surface of one element bed and a connecting-side end surface of the other element bed, the end surface of the one element bed and the end surface of the other element bed are not in contact with each other. Therefore, connecting rigidity between the one element bed and the other element bed is not high. Further, although Patent Literature 1 states that the element beds are connected to each other by the connecting mechanism in a state where the packing is interposed between the element beds and the element beds are drawn to each other to minimize the distance between them, the packing being interposed can cause positional deviation between the element beds. Consequently, there is the possibility of leakage of cutting fluid and the like out of the machine tool, and, in the case of using coolant, there is also the possibility of leakage of the coolant out of the machine tool.

The present invention has been achieved in view of the above-described circumstances, and an object thereof is to provide a machine tool bed which is able to provide a higher connecting rigidity between element beds and prevent positional deviation between the element beds, thereby preventing leakage of coolant.

Solution to Problem

The present invention, for solving the above-described problems, is a machine tool bed configured by integrally connecting two or more element beds in a horizontal direction, the element beds to be connected each having a joint surface arranged to intersect with a horizontal plane, at least one element bed of the element beds to be connected to each other having a seal groove in the joint surface thereof, and the seal groove being filled with a sealant in a state where the element beds to be connected to each other are connected to each other.

In the present invention, at least one element bed of the element beds to be connected to each other has a seal groove provided thereon. The seal groove is filled with a sealant in a state where the element beds to be connected to each other are connected to each other. Note that the seal groove is formed to divide a seal target area from the area other than the seal target area on the joint surface, the seal target area including at least a part of an upper edge of the joint surface. With this configuration, even if coolant used during machining spatters on the bed and enters the inside of the bed through the upper edge of the joint surface, the coolant is blocked by the sealant and therefore does not enter the area below the sealant, which prevents leakage of coolant out of the bed.

Thus, in the present invention, differently from the conventional art in which a packing is interposed between element beds, at least one element bed of the element beds to be connected to each other has a seal groove formed in the joint surface thereof and the seal groove is filled with a sealant in a state where the element beds to be connected to each other are connected to each other; therefore, one element bed and the element bed can be connected to each other with their joint surfaces in contact with each other. Consequently, a higher connecting rigidity between the element beds can be produced than in the conventional art and the sealant makes it possible to liquid-tightly separate the seal target area from the other area. Further, the conventional packing is not interposed between the element beds; therefore, there is no occurrence of positional deviation between the element beds. Consequently, coolant does not leak out of the sealant. Furthermore, the seal groove is filled with the sealant in a state where the element beds to be connected to each other are connected to each other, that is, the sealant is arranged so as not to be visually recognized from the outside; therefore, the sealant in the present invention is less likely to touch coolant than the conventional packing that is interposed between a connecting-side end surface of one element bed and a connecting-side end surface of the other element. Consequently, deterioration of the sealant can be suppressed and the sealant can be prevented from being damaged by a cleaning tool or the like during cleaning.

In the present invention, it is preferable that the sealant is a fluid sealant.

This configuration facilitates filling the sealant into the seal groove. This configuration is particularly effective in a case where the seal groove is formed to follow a complicated route in the joint surface.

In the present invention, it is preferable that both ends of the seal groove each have an opening in an upper surface of the element bed and the seal groove is configured to allow the fluid sealant to be injected into the seal groove from the openings of both ends of the seal groove.

This configuration facilitates filling the sealant into the seal groove since both ends of the seal groove each have the opening in the upper surface of the element bed.

In the present invention, it is preferable that the seal groove has one or more branch grooves branching off at an intermediate position of the seal groove, the branch grooves each have an opening in the upper surface of the element bed, and the seal groove is configured to allow the fluid sealant to be injected into the seal groove from the openings of the branch grooves.

This configuration enables the sealant to be filled into the seal groove not only from both ends of the seal groove but also from the branch grooves of the seal groove. Therefore, even if the seal groove is formed to follow a complicated route in the joint surface, the entire seal groove can be filled with the sealant. Consequently, the sealant can provide a reliable seal function.

In the present invention, it is preferable that the openings of the seal groove into which the sealant has been injected are each sealed by a sealing member.

This configuration prevents coolant entering the inside of the element beds through the openings of the seal groove since the openings of the seal groove are each sealed by the sealing member. Consequently, the sealant is less likely to touch coolant, which extends the life of the coolant.

In the present invention, it is preferable that the machine tool bed includes a reservoir for holding coolant, the element beds are configured to form the reservoir in a state of being integrally connected, and on the joint surfaces of the element beds forming the reservoir, an area including an edge corresponding to the reservoir is included in the seal target area.

In this configuration, the reservoir is formed as a part of the machine tool bed in a state where the element beds are connected. The reservoir holds coolant therein. In this configuration, the presence of the sealant prevents coolant in the reservoir entering the area other than the seal target area from the seal target area since the area including the edge corresponding to the reservoir is included in the seal target area. Consequently, leakage of coolant out of the machine tool bed is prevented.

Advantageous Effects of Invention

As described above, the present invention provides a higher connecting rigidity between the element beds and prevents positional deviation between the element beds, thereby enabling prevention of leakage of coolant.

DESCRIPTION OF EMBODIMENTS

Hereinafter, a machine tool bed according to an embodiment of the present invention will be described with reference to the drawings. The machine tool in this embodiment is, for example, an NC lathe.

Figure 1:
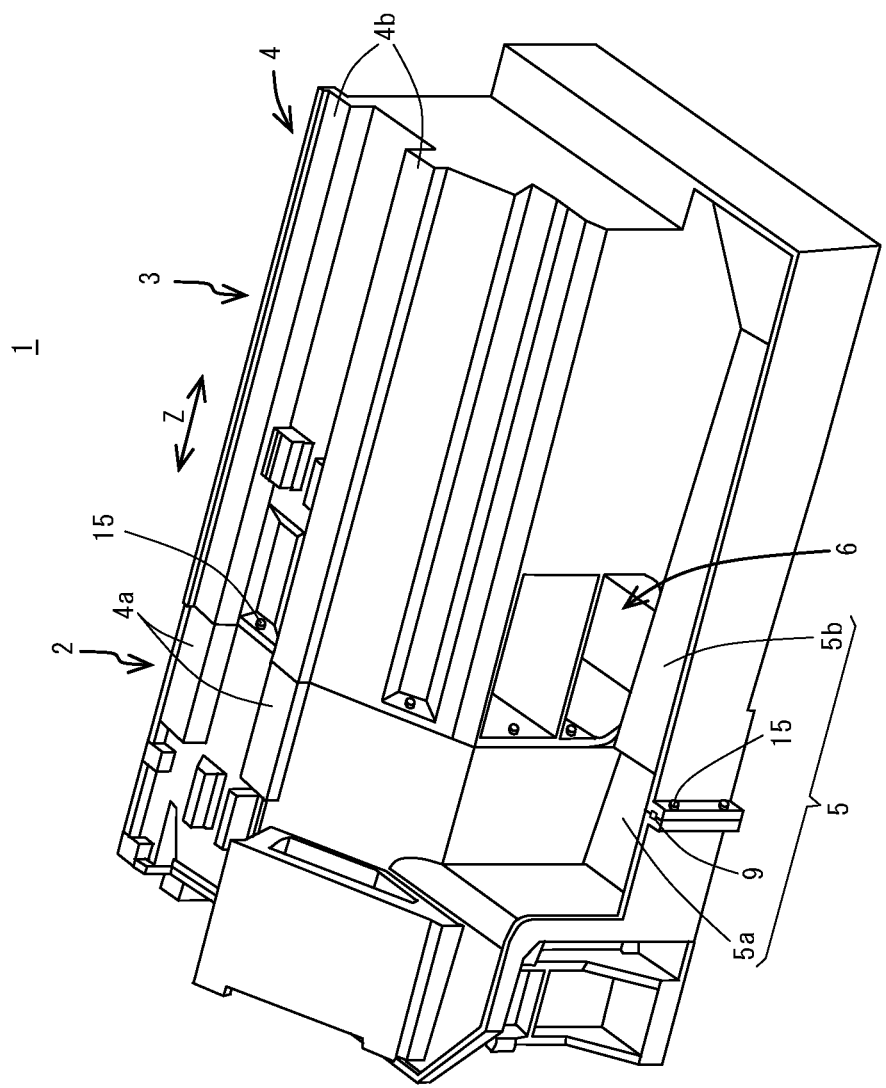
FIG. 1 is a perspective view of a machine tool bed according to an embodiment of the present invention.

The machine tool bed 1 according to this embodiment is configured by integrally connecting at least two element beds in a horizontal direction. As shown in FIG. 1, the machine tool bed 1 has one element bed 2 and the other element bed 3 connected to each other. The element bed 2 and element bed 3 to be connected to each other have their respective joint surfaces intersecting with a horizontal plane. In this embodiment, the joint surfaces of the element bed 2 and element bed 3 are perpendicular to a horizontal plane.

The machine tool bed 1 has a guide rail 4 provided thereon to which a linear guide (not shown) is slidably attached, the linear guide allowing a carriage (not shown) to reciprocate in a Z-axis direction, the carriage supporting a tool rest (not shown). The guide rail 4 is formed by connecting a guide rail 4a provided on the element bed 2 to a guide rail 4b provided on the element bed 3. Note that the tool rest supports a turret to which tools are attached. Further, the machine tool bed 1 has a headstock (not shown) provided thereon which supports a spindle, the spindle having a chuck attached thereto, the chuck clamping a workpiece arranged horizontally.

The machine tool bed 1 includes a reservoir 5 for holding coolant to be used during machining. The reservoir 5 is formed by connecting a reservoir 5a provided on the element bed 2 to a reservoir 5b provided on the element bed 3. Note that the reservoir 5 is located on a lower part of the bed 1.

The element bed 3 has a hole 6 in which a chip conveyor (not shown) is inserted, the chip conveyor conveying chips produced during machining. The chips are conveyed to a collecting box (not shown) by the chip conveyor.

Figure 2:
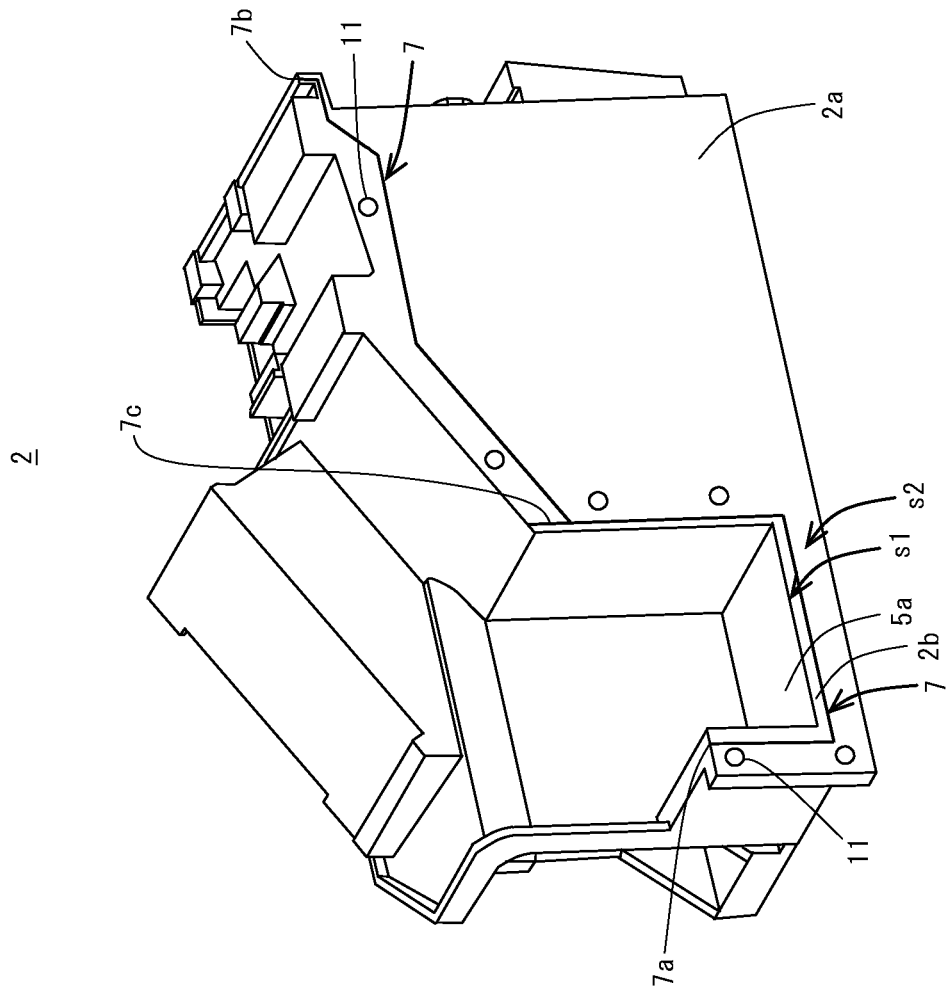
FIG. 2 is a perspective view of one element bed constituting the machine tool bed shown in FIG. 1.

FIG. 2 is a perspective view of the element bed 2 constituting the machine tool bed 1 shown in FIG. 1. As shown in FIG. 2, the joint surface 2a of the element bed 2 has a seal groove 7 formed therein. The seal groove 7 is formed to divide the joint surface 2a into a seal target area s1 and an area s2, the seal target area s1 including at least a part of an upper edge 2b of the joint surface 2a, the area s2 being the entire area of the joint surface 2a except the seal target area s1. That is, the seal target area s1 may include a part or the upper edge 2b of the joint surface 2a or include the entire upper edge 2b of the joint surface 2a. In the example shown in FIG. 2, the seal target area s1 includes the entire upper edge 2b of the joint surface 2a. Accordingly, on the joint surface 2a of the element bed 2 forming the reservoir 5, an area including the upper edge portion 2b corresponding the reservoir 5 (i.e., the reservoir 5a) is included in the seal target area s1. Note that the upper edge 2b means an edge of the upper one of the two areas of the joint surface 2a that are vertically divided from each other by the seal groove 7a.

Figure 3:
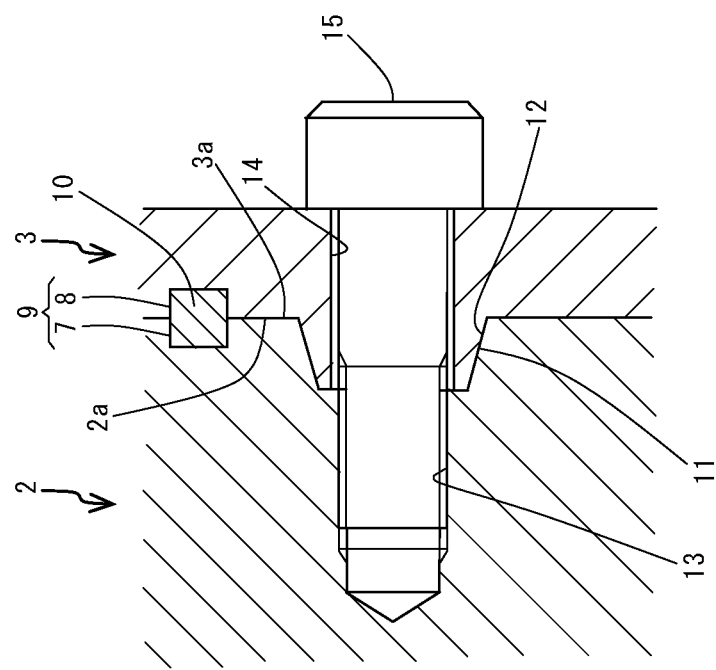
FIG. 3 is a sectional view showing a seal groove as well as fastening means between one element bed and the other element bed in the embodiment of the present invention.

Further, as shown in FIG. 3, the joint surface 3a of the element bed 3 also has a seal groove 8 formed therein, the seal groove 8 being formed at a position corresponding to the seal groove 7 of the element bed 2 in the connected state. In this embodiment, in the state where the element bed 2 and the element bed 3 are connected to each other, the seal groove 7 and the seal groove 8 are oppositely arranged, and thereby the seal groove 7 and the seal groove 8 are put together to form a seal groove 9 which has, for example, a square cross section.

In the state where the element bed 2 and the element bed 3 are connected to each other (the state shown in FIG. 1), the seal groove 9 is filled with a sealant. Thereby, the seal target area s1 in FIG. 3 is fluid-tightly separated from the area s2 by the sealant. That is, coolant is blocked by the sealant so as not to enter the other area s2 from the seal target area s1. This configuration prevents leakage of coolant out of the bed 1.

The sealant may employ a fluid sealant. The fluid sealant is injected into the seal groove 9 and then solidifies at room temperature. Thereby, the seal groove 9 is plugged by the solidified sealant. Note that the fluid sealant may employ, for example, silicone resin or the like.

As shown in FIG. 2, both ends 7a, 7b of the seal groove 7 each have an opening in an upper surface of the element bed 2. Although illustration is omitted, both ends of the seal groove 8 (see FIG. 3) also each have an opening in an upper surface of the element bed 3. In this configuration, the fluid sealant is injected into the seal groove 9 from both ends 7a, 7b of the seal groove 7 and both ends of the seal groove 8.

If the entire length of the seal groove 9 into which the fluid sealant should be injected is long, or when the seal groove 9 has a path extended vertically, or depending on the viscosity of the fluid sealant to be used, it is possible that the injected fluid sealant does not flow into the entire seal groove 9. Therefore, as shown in FIG. 2, one or more branch grooves 7c are provided at an intermediate position of the seal groove 7, the branch grooves 7 branching off from the seal groove 7 at the intermediate position. Note that the intermediate position means a position between the end 7a and the end 7b of the seal groove 7. The end of the branch groove 7c opens to the upper surface of the element bed 2. From the aforementioned aspect, the fluid sealant can be injected from both ends 7a, 7b of the seal groove 7 and the branch groove 7c. However, when the fluid sealant is injected only from both ends 7a, 7b of the seal groove 7, air is released through the branch groove 7c, which suppresses the occurrence of bubbles in the injected fluid sealant. Thus, the branch groove 7c also has an air vent function. Note that, although illustration is omitted, the groove 8 of the element bed 3 also has a similar branch groove at a position corresponding to the branch groove 7c.

As shown in FIG. 3, the openings of both ends of the seal groove 9 into which the fluid sealant has been injected are each sealed by a sealing member 10.

Next, a process of connecting the element bed 2 to the element bed 3 is described. As shown in FIG. 3, the joint surface 2a of the element bed 2 has a plurality of concave positioning parts 11 provided thereon, and the joint surface 3a of the element bed 3 has a plurality of convex positioning parts 12 provided thereon at positions corresponding to the concave positioning parts 11. The convex positioning parts 12 are formed in, for example, a circular truncated cone shape. Further, the concave positioning parts 11 are formed in a tapered shape, into which the convex positioning parts 12 are to be fitted. When the element bed 2 is connected to the element bed 3, the element beds are positioned by the convex positioning parts 12 fitting into the concave positioning parts 11.

Each convex positioning part 12 of the element bed 3 has a bolt hole 14 formed therein which axially passes through the element bed 3. Further, the element bed 2 has a screw hole 13 formed therein at each of the portions where the concave positioning parts 11 are provided, the screw hole 13 being formed at a position corresponding to the bolt hole 14. In this configuration, in the state where the element bed 2 is connected to the element bed 3, that is, in the state where the convex positioning parts 12 are respectively fitted in the concave positioning parts 11, bolts 15 are respectively screwed into the screw holes 13 via the bolt holes 14.

As described above, in this embodiment, differently from the conventional art in which a packing is interposed between element beds, the element bed 2 and the element bed 3 can be connected to each other with the joint surfaces 2a, 3a thereof in contact with each other because of the configuration in which the joint surface 2a of the element bed 2 and the joint surface 3a of the element bed 3 respectively have the seal groove 7 and the seal groove 8 provided therein and the seal groove 9 that is formed by the seal groove 7 and seal groove 8 put together is filled with the sealant. Therefore, a higher connecting rigidity between the element beds can be produced than in the conventional art. Further, there is no occurrence of positional deviation between the element beds since no packing is interposed between the element beds. Therefore, it is not possible that coolant leaks out of the sealant due to the influence of positional deviation. Further, the sealant in this embodiment is less likely to touch coolant than the conventional packing, which is interposed between a connecting-side end surface of one element bed and a connecting-side end surface of the other element bed, since the sealant is filled into the seal groove 9 with the element beds 2, 3 being connected to each other, that is, since the sealant is arranged so as not to be visually recognized from the outside. Consequently, deterioration of the sealant can be suppressed and the sealant can be prevented from being damaged by a cleaning tool or the like during cleaning.

Further, in this embodiment, employing a fluid sealant for the sealant facilitates filling the sealant into the seal groove 9. This is particularly effective in the case where the seal groove 9 is formed to follow a complicated route in the joint surfaces 2a, 3a.

Further, in this embodiment, it is easy to fill the sealant into the seal groove 9 since both ends of the seal groove 9 each have the opening in the upper surfaces of the element beds 2, 3.

Further, in this embodiment, the seal groove 7 is formed to have the branch groove 7c branching off at an intermediate position of the seal groove 7. Therefore, even in the case where the seal groove 7 is formed to follow a complicated route in the joint surface 2a, the fluid sealant can be filled into the entire seal groove 7 since the sealant can be injected also from the branch groove 7c. Alternatively, the fluid sealant may be injected only from both ends 7a, 7b of the seal groove 7; in this case, air is released through the branch groove 7c and thereby the occurrence of bubbles in the fluid sealant is suppressed. This configuration enables the sealant to provide a reliable seal function. Note that the same applies to the branch groove of the seal groove 8.

Further, in this embodiment, the openings of both ends of the seal groove 9 into which the fluid sealant has been injected are each sealed by the sealing member 10. This prevents coolant entering the inside of the element beds 2, 3 through the openings. Consequently, the sealant is less likely to touch coolant, which extends the life of the sealant.

Further, in this embodiment, the presence of the sealant prevents coolant in the reservoir 5 entering the other area s2 from the seal target area s1 since the area including the upper edge corresponding to the reservoir 5 is included in the seal target area s1. Consequently, leakage of coolant out of the machine tool bed 1 is prevented.

Hereinbefore, a machine tool bed according to one embodiment of the present invention has been described. However, the machine tool bed according to the present invention is not limited to the above-described embodiment and can be implemented in other manners. The following variations may be applied to the machine tool bed.

In the above embodiment, the machine tool bed 1 is constituted by two element beds 2, 3. However, the machine tool bed according to the present invention is not limited to such a configuration and may be constituted by three or more element beds.

Further, in the above embodiment, the element bed 2 has the seal groove 7 formed thereon and the element bed 3 has the seal groove 8 formed thereon. However, the machine tool bed according to the present invention is not limited to such a configuration and may have a configuration in which at least one element bed of the element beds connected to each other has a seal groove formed thereon. For example, a configuration is possible in which only the element bed 2 has the seal groove 7 formed thereon with the element bed 3 not having the seal groove 8 formed thereon.

Further, in the above embodiment, the seal groove 7 has one branch groove 7*c* branching off at an intermediate position of the seal groove 7. However, the machine tool bed according to the present invention is not limited to such a configuration and the seal groove 7 may have two or more branch grooves 7*c*.

Further, in the above embodiment, the openings of both ends of the seal groove 9 into which the fluid sealant has been injected are each sealed by the sealing member 10. However, the sealing member 10 is not an essential element.

Further, in the above embodiment, both ends of the seal groove 9 each have the opening. However, the machine tool bed according to the present invention is not limited to such a configuration and may have a configuration in which only one of both ends of the seal groove 9 has the opening.

Furthermore, in the above embodiment, an NC lathe is provided as an example of the machine tool. However, the machine tool to which the present invention is applied is not limited to an NC lathe and may be another type of machine tool, such as a machining center or the like.

REFERENCE SIGNS LIST

1 Machine tool bed
2 One element bed
2*a* Joint surface of one element bed
3 the other element bed
3*a* Joint surface of the other element bed
5 Reservoir
7 Seal groove
8 Seal groove
9 Seal groove
10 Sealing member

The invention claimed is:

1. A machine tool bed configured by integrally connecting two or more element beds in a horizontal direction, the element beds to be connected each having a joint surface arranged to intersect with a horizontal plane, comprising:
   the machine tool bed including a reservoir for holding coolant,
   the element beds being configured to form the reservoir in a state of being integrally connected,
   at least one element bed of the element beds to be connected to each other has having a seal groove in the joint surface thereof,
   the seal groove being filled with a sealant in a state where the element beds to be connected to each other are connected to each other, and
   on the joint surfaces of the element beds forming the reservoir, an area including an edge corresponding to the reservoir being included in a seal target area.

2. The machine tool bed according to claim 1, wherein the sealant is a fluid sealant.

3. The machine tool bed according to claim 2, wherein:
   both ends of the seal groove each have an opening in an upper surface of the element bed; and
   the seal groove is configured to allow the fluid sealant to be injected into the seal groove from the openings of both ends of the seal groove.

4. The machine tool bed according to claim 3, wherein:
   the seal groove has one or more branch grooves branching off at an intermediate position of the seal groove;
   the branch grooves each have an opening in the upper surface of the element bed; and
   the seal groove is configured to allow the fluid sealant to be injected into the seal groove from the openings of the branch grooves.

5. The machine tool bed according to claim 4, wherein the openings of the seal groove into which the fluid sealant has been injected are each sealed by a sealing member.

6. The machine tool bed according to claim 3 wherein the openings of the seal groove into which the fluid sealant has been injected are each sealed by a sealing member.

* * * * *